ELECTRICAL FILTERS

Filed April 16, 1968 3 Sheets-Sheet 1

United States Patent Office 3,555,439

Patented Jan. 12, 1971

3,555,439

ELECTRICAL FILTERS

Arthur Tisso Starr, New Barnet, and Thomas Charles Reeve, London, England, assignors to The Rank Organisation Limited, London, England, a British company Filed Apr. 16, 1968, Ser. No. 721,710
Claims priority, application Great Britain, Apr. 19, 1967, 17,999/67
Int. Cl. H03b *1/04*
U.S. Cl. 328—167 10 Claims

ABSTRACT OF THE DISCLOSURE

An electric signal including high and low frequency components is (a) filtered to remove the high frequencies without distorting the low frequencies, and (b) delayed to synchronise it, without distortion, with the filtered signals. The filtered signal is subtracted from the delayed signal to provide a signal comprising the undistorted high frequency component.

This invention relates to methods of and apparatus for separating from a composite electric signal containing relatively higher and lower frequencies, a component consisting of the relatively higher frequencies.

It is an object of this invention to effect such separation without introducing unacceptable phase distortion in the relatively higher frequency component.

According to one aspect of this invention there is provided a method of separating from a composite electric signal containing relatively higher and lower frequencies, a component consisting of the relatively higher frequencies, comprising passing the composite signal through a low-pass filter effective to reject the relatively higher frequencies and to pass, without phase distortion, only the relatively lower frequencies, delaying the composite signal, without introducing phase distortion, by an amount equal to the time delay of the low-pass filter in order to bring the composite and the filtered signals into synchronism, and subtracting the filtered signal from the synchronised composite signal to produce a resulting signal which is the component consisting of the relatively higher frequencies.

According to another aspect of this invention there is provided apparatus for separating from a composite electric signal containing relatively higher and lower frequencies, a component consisting of the relatively higher frequencies, comprising a low-pass filter for rejecting the relatively higher frequencies and passing, without phase distortion, only the relatively lower frequencies, delay means for delaying the composite signal, without introducing phase distortion, by an amount equal to the time delay of the low-pass filter so as to bring the composite and the filtered signals into synchronism, and signal combination means for subtracting the filtered signals from the delayed composite signal to produce a resulting signal which is the component consisting of the relatively higher frequencies.

Such a method or apparatus involves no operation on the relatively higher frequency component other than distortion-free delaying, and so will not introduce phase distortion.

One way in which such a composite signal can arise, and in which the high frequency component requires analysis, is in the assessment of the surface profile of a workpiece, wherein an electric signal is derived from a sensor as it traverses the surface under test. The higher frequency component is representative of the roughness of the surface.

Irregularities in the surface profile of a workpiece can in general be considered as falling broadly into three main groups respectively referred to as roughness, waviness and errors of form in descending order of frequency. In the case of a machined surface, these irregularities respectively stem from the material cutting or abrasive action of the machining process, from defects such as vibration between the tool and the workpiece and from imperfect guiding of the tool from its intended path. The irregularities are generally distinguished by the difference in their dominant crest spacings and therefore in the frequency or wavelength band of a signal derived from any suitable means and representative of the surface as a whole. An electric signal representative of the surface profile as a whole is conveniently produced by a sensor having a stylus engaging and traversing the surface under test.

In assessing the surface finish of a machined workpiece surface, it has been found essential in many applications to assess each of these groups of irregularities separately. Accordingly, to enable such an individual assessment to be made, any apparatus intended for this purpose must include means for separating from the signal representative of the surface profile as a whole, that component representative of the group under investigation, such as roughness.

Hitherto, it has become accepted practice in assessing the roughness of a workpiece surface, to generate an electric profile signal representative of the surface profile as a whole and to pass this signal through a standardised two stage CR filter effective to separate from the profile signal that frequency band representative of the roughness component.

Such a standard two stage CR filter is described in "The Equation of the Mean Line or Surface Texture Formed by an Electric Wave Filter" by D. J. Whitehouse and R. E. Reason, published by Rank Taylor Hobson Limited, England, 1965 and comprises two individual CR filter stages coupled in cascade with the second stage arranged not to load the first stage.

One disadvantage of this type of standard filter is that the phase shift with frequency of an input wave form is not linear so that roughness signals of relatively higher frequency emerge at the filter output before those of a relatively lower frequency. The phase distortion of the output signal produced by such a filter produces a roughness value at any particular point on the workpiece surface which is not closely correlated with the true roughness value at that point as represented by the sensor output signal and any assessment of the roughness will therefore include inherent errors brought about by such phase distortion.

In the case of certain types of roughness, for example example roughness of a rectangular rather than sinusoidal profile, these inherent errors can be considerable and render the assessment most inaccurate. The peak-to-valley amplitude changes may be doubled by such phase distortion.

The errors brought about by such phase distortion are particularly significant where measurement of the roughness peaks of the surface under test are required. In this case any phase distortion will bring about an actual error in the amplitude of the signal peaks emerging from the two stage CR filter and representative of the roughness peaks of the surface under test.

A method or apparatus of this invention is particularly suitable for deriving the roughness component from a surface profile representative signal. For such an application a low-pass filter effective to reject the roughness component is used.

Conveniently, there may be included in the delay means magnetic recording and replay apparatus in which the recording and replay positions are so spaced in relation to the speed of the magnetic medium to be used as to produce the desired amount of delay.

Alternatively digital techniques may be used to achieve the desired delay. There may be included in the signal combination means, means for inverting the signal from the low-pass filter and means for adding the inverted signal and the delayed composite signal.

Preferably, the transversal filter is adapted to provide an output comprising the inverse of the frequencies passed, and wherein the signal combination means comprises a summing circuit.

There may be included in the delay means magnetic recording and replay apparatus in which the recording and replay positions are so spaced in relation to the speed of magnetic medium to be used as to produce the desired amount of delay.

Conveniently there is included in the delay means digital storage means for storing at different addresses thereof successive digital representations of the instantaneous level of said composite signal, means for deriving said digital representations at a rate sufficient to register the highest significant frequency, and means operable at said rate for directing said digital representations, in their order of storage and after the desired delay, from the storage means to means for providing analogue signal levels according to the values of said digital representations.

The means for deriving and the means for providing may comprise a combined analogue-to-digital and digital--to-analogue converter responsive to successive timing signals to alternate between its modes of operation, and the means for directing is included in transfer control means responsive to said timing signals to alternate between gating the latest digital representation from the converter to the next available said address and gating to the converter the contents of a said address that have been stored for a number of said timing signals equal to the desired delay.

The delay means may further comprise a clock source for providing said timing signals at twice said rate. Advantageously the storage means may comprise a word-organised magnetic store having a word capacity of one-half the largest even number not exceeding said number of timing signals. In some applications it may be convenient that the capacity of the storage means should be such as will permit variation of the delay provided between a minimum and a maximum time both determined by the range of surface parameters.

The filtered signal may be subtracted from the composite delayed signal by any of the well known methods. For example, one signal may be inverted and then added to the other, either by a resistive network or by a shunt feedback summing amplifier. When a resistive network is used, the filtered signal is inverted to maintain the polarity of the combined signal unchanged from the input. Due to the inversion in a shunt feedback system, the composite signal is inverted and added to the filtered signal to maintain the polarity of the output in this system.

It is preferable that the low pass filter should include a low pass transversal filter, the first frequency pass band of which transmits the frequencies that are finally to be rejected, that is, the signals due to waviness and errors of form, and has a closely controlled frequency roll-off. The transversal filter will normally require a backing-up filter to reject the frequencies which are higher than the transversal filter can reject, either because of image pass bands or because of deficiencies in its delay networks.

An embodiment of the invention will now be described, by way of example, with reference to the drawings in which.

Figure 1:
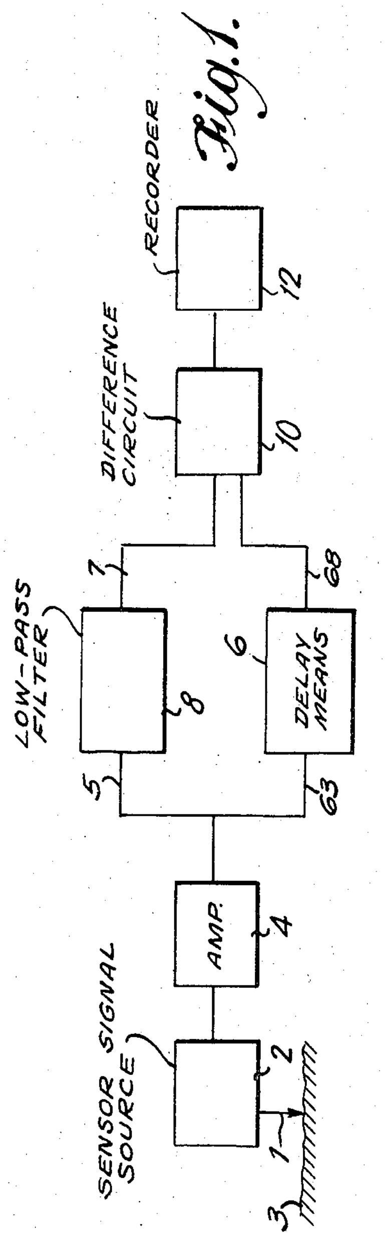
FIG. 1 is a schematic representation, in block diagram form, of a preferred embodiment of the invention.

Referring to FIG. 1, this shows a sensor signal source 2 having a stylus 1 adapted to traverse a surface 3 under test and to produce an output signal which is representative of the profile of the surface. The sensor signal source 2 and stylus 1 comprise a sensing transducer of conventional design and may, for example, comprise a piezo-electric or electromagnetic transducer of a type well known in the art. The electric output signal from the sensor signal source 2 will include relatively lower frequency components representative respectively of the errors of form and the waviness of the surface as well as a component of a relatively higher frequency band representative of the roughness of the surface.

In order to separate from the sensor output signal that component representative of the surface roughness, the signal is first amplified in an amplifier 4 the output of which is passed through a low-pass filter 8 effective to reject the roughness component only and to pass only those relatively lower frequency components representative of waivness and errors of form.

The low pass filter 8 is designed to introduce a phase shift which is linear with frequency into the filtered signal, so that all the low frequency components are subject to the same time delay, being the slope of the phase shift. Accordingly all the low frequency components in the filtered signal will cancel out the corresponding low frequency components in the composite signal, either completely or in part as determined by the defined cut-off characteristic of the transversal filter, after these have been delayed by the same amount.

The output from the amplifier 4 is also passed into the input of the delay circuit 6 effective to delay the amplified sensor output signal by an amount equal to the time delay introduced in the low-pass filter 8 so that the outputs of the filter 8 and the delay circuit 6 are synchronised.

A differential circuit arrangement 10 is arranged to back the output signal from the filter 8, off against the synchronised output signal from the delay circuit 6, to produce, as an output signal, only the roughness component present in the composite signal from the sensor 2. The roughness component output signal from the circuit 10 is then passed to a suitable recorder 12.

The circuit arrangement disclosed, avoids operation upon the roughness component of the sensor output signal, other than a distortionless delay, and is thus effective to isolate this component without introducing thereinto any phase distortion, which would introduce errors into the roughness measurement.

Preferably the low pass filter is a transversal filter comprising a plurality of delay sections in cascade together with elements enabling the outputs of the sections to be suitably combined.

In such a transversal filter, the initial low frequency pass band portion of the frequency response is, in theory, repetitively imaged at higher frequencies to produce a number of progressively higher frequency pass bands. In practice, this only holds true for those frequencies for which the delay sections act as pure delays i.e. they introduce no phase or amplitude distortion. Accordingly the filter is not wholly effective to reject all the relatively higher frequency components of the composite output signal, and a backing low-pass filter, having only one low frequency pass-band which is not imaged at higher frequencies must therefore be used in tandem with such a transversal low-pass filter to ensure that these higher frequency components passing through the corresponding image pass-bands are wholly rejected.

The backing filter must not introduce any phase or amplitude distortion of the signal and hence its frequency response must be flat, and its phase shift linear up to a frequency above the frequency at which the output of the transversal filter has fallen to zero. The amplitude/frequency response of the backing filter must then fall to a negligible amount at a frequency sufficiently low for the transversal filter to be able to reject it. Then, the overall frequency response of the low pass filter 8 is defined by the first pass-band of the transversal filter.

Figure 2:
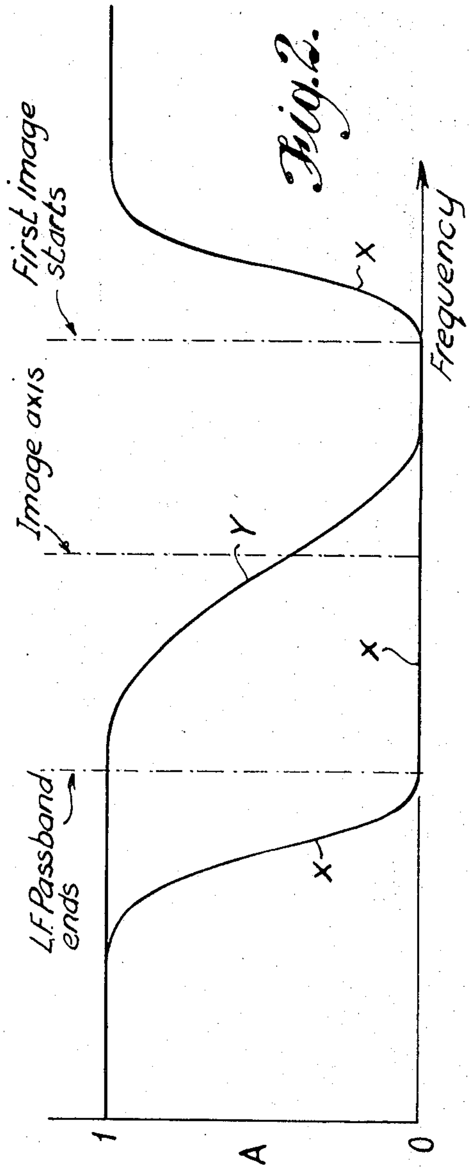
FIG. 2 shows a general, composite frequency response characteristic for a low-pass filter suitable for this embodiment.

FIG. 2 shows the typical admittance (A) frequency responses of a suitable transversal low-pass filter and its backing low-pass filter. In this figure the frequency response of the transversal filter is shown at X and that of the backing filter at Y. It will be seen that the drop of Y falls wholly within the rejection band between the first, low frequency pass band of X and the first, higher frequency image thereof.

The frequency response of a transversal filter is symmetrical about a line (the image axis) perpendicular to the frequency axis and bisecting the rejection band, provided that the delay stages have sufficient bandwidth. The width of the rejection band may be fixed at will by the number of taps and the delay between them.

Figures 3, 4:
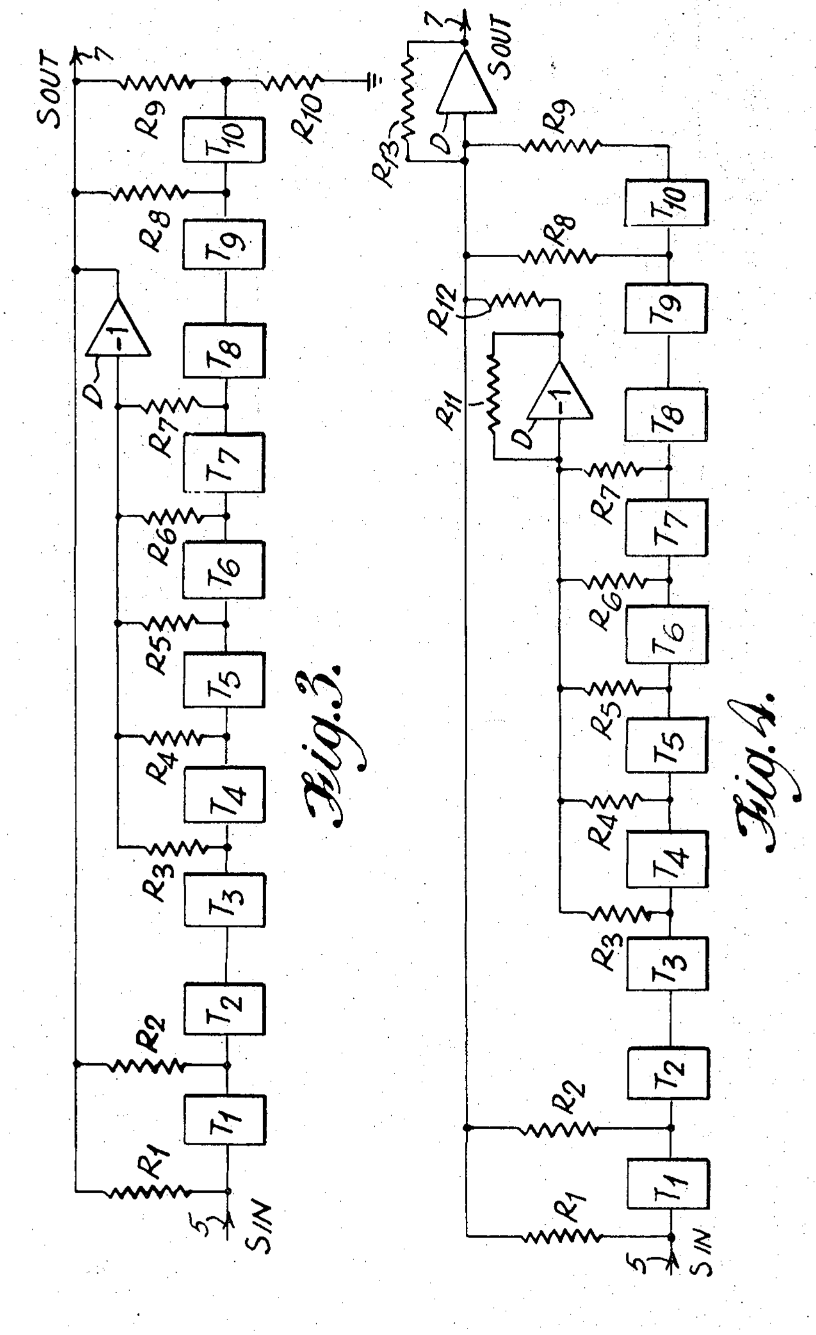
FIG. 3 shows, in principle, a transversal filter suitable for use as the low-pass filter of FIG. 1.
FIG. 4 shows a more practicable filter in which, where applicable, the same references are used as for FIG. 3.

A suitable transversal filter with equal delay sections and having only resistive tappings is shown in FIG. 3. The frequency characteristic is designed to be $A_0=1$ at zero frequency, $A_1=1$ at frequency $f_1$, $A_2=\frac{1}{2}$ at frequency $2f_1$, and $A_3=A_4=A_5=A_6=0$ at frequencies $3f_1$, $4f_1$, $5f_1$, and $6f_1$.

The conductances $g$ of the tappings can be calculated from the formulae:

$$g_0=\frac{1}{n}\left(\tfrac{1}{2}A_0+A_1+\ldots+A_{n-1}+\tfrac{1}{2}A_n\right)$$

$$g_s=\frac{1}{n}\left(\tfrac{1}{2}A_0+A_1\cos\frac{s\pi}{n}+A_2\cos\frac{2s\pi}{n}+\ldots+A_{n-1}\cos\frac{(n-1)s\pi}{n}+\tfrac{1}{2}A_n\cos\frac{ns\pi}{n}\right)$$

and $$gn=\frac{1}{2n}\left(\tfrac{1}{2}A_0+A_1\cos\frac{n\pi}{n}+A_2\cos\frac{2n\pi}{n}+\ldots+\tfrac{1}{2}A_n\cos\frac{nn\pi}{n}\right)$$

Here $g_0$ is the conductance at the middle tap, $n=6$ is the number of taps on either side of the middle tap, and $g_s$ is the conductance at the tappings $s$ on either side of the centre tap, between the middle tap and the end taps. The delay, T, of each section of the transversal filter is calculated from the fact that $\omega T=\pi$ at the image frequency $\omega/2\pi$. In this case the image frequency is $6f_1$, and thus $$T=\frac{\pi}{\omega}=\frac{\pi}{2\pi\times 6f_1}=\frac{1}{12f_1}$$

From the formulae for the conductances at the taps it is found that $g_0=\frac{1}{3}$, $g_1=0.269$, $g_2=0.125$, $g_3=0$, $g_4=-0.0417$, $g_5=-0.019$, and $g_6=0$. Because $g_6=0$, only ten delay sections are needed. As $g_3=0$, only nine taps are required, as shown in FIG. 3, in which the ten delay sections found to be required are designated $T_1$ to $T_{10}$ from the signal input end of the line. The resistive taps are designated $R_1$ to $R_9$, also from the input end of the delay line.

As the conductances $g_4$ and $g_5$ (corresponding to $R_2$, $R_8$ and $R_1$, $R_9$ respectively) are negative, it is convenient to add the signals from $R_3$, $R_4$, $R_5$, $R_6$ and $R_7$ separately in a shunt feedback amplifier and then add the output of this amplifier to the signals from $R_1$, $R_2$, $R_8$, and $R_9$ in a second shunt feedback amplifier, as is shown in FIG. 4. The double inversion will give the output signal the same polarity as the input.

Each delay section may comprise an all pass or low-pass circuit, for example one or more circuits of the bridge-T type. Alternatively active RC circuits may be used of the type discussed in the article "A Practical Method of Designing RC Active Filters" by R. P. Sallen and E. L. Key in IRE Transactions—Circuit Theory for March 1955 or of modification of the type discussed in an article in Proc. I.E.E. December 1967, vol. 114, No. 12, at page 1871 by A. G. J. Holt and J. P. Gray.

It is not essential for the taps to be wholly resistive, they may comprise capacitive or inductive elements.

As mentioned hereinbefore, the delay circuit 6 for introducing distortionless delay in the amplified sensor output signal may take any one of several forms well known in the art and may, for example, comprise magnetic recording and replay apparatus, conveniently apparatus using magnetic tape. This form is shown in FIG. 6 wherein a record head 22 and a replay head 24 are so spaced along the path of the magnetic recording medium 20 that an interval of time equal to the desired delay elapses between the time a signal is recorded by head 22 and replayed by the head 24.

Figures 5, 6:
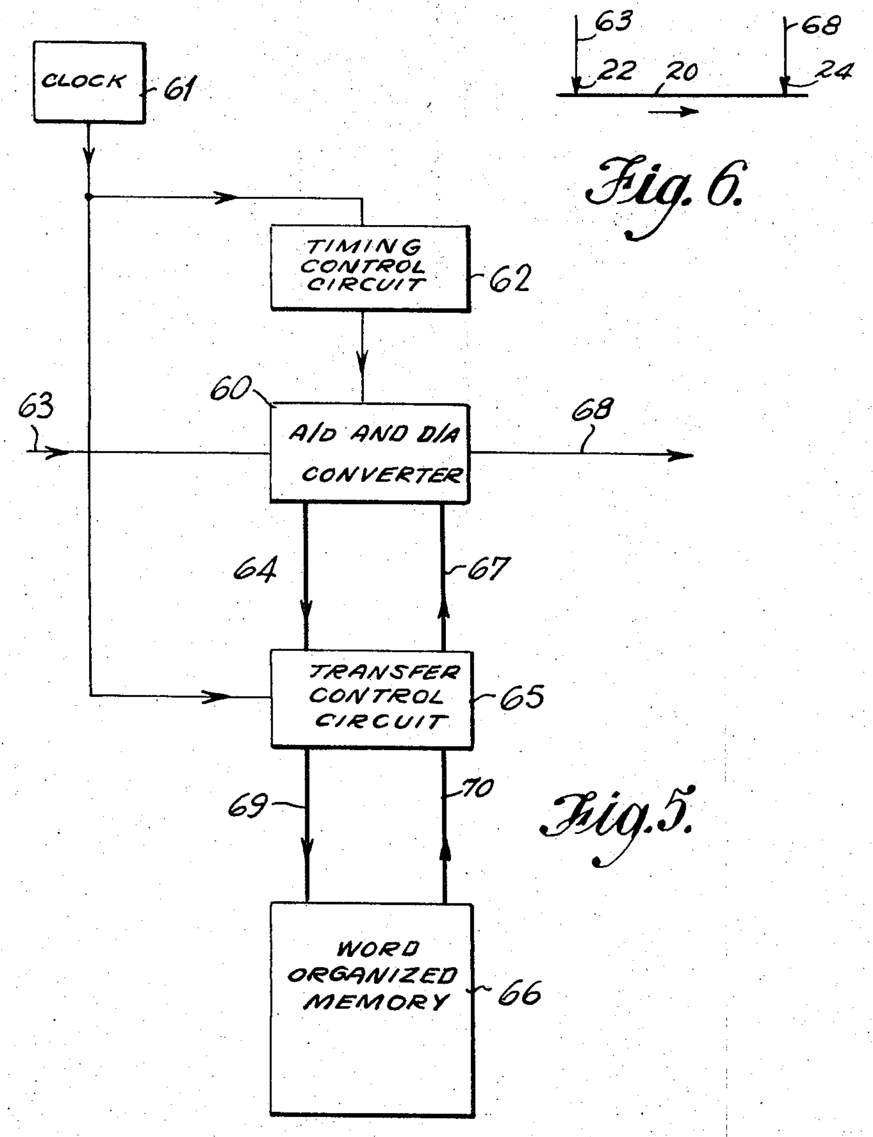
FIG. 5 shows a preferred digital arrangement of the delay means in block diagram form.
FIG. 6 shows a suitable form of magnetic delay means suitable for use as the delay means of FIG. 1.

Alternatively, the delay circuit 6 may comprise means employing digital storage techniques as illustrated in FIG. 5. The embodiment shown in FIG. 5 includes a conventional combined analogue-to-digital (A/D) and digital-to-analogue (D/A) converter 60 switchable between its A/D and D/A modes of operation by timing signals from a clock source 61 via a timing control circuit 62. The converter 60 receives the amplified sensor output signal on lead 63, and when in its A/D mode of operation provides on lead 64, a binary digital representation of the instantaneous amplitude of the input signal.

A transfer control circuit 65 also has two modes of operation and is switched between these modes by the output pulser of the clock source 61. The first mode occurs whenever a digital representation is derived by the converter 60 and applied to the lead 64. The control circuit 65 then gates that digital representation to the next available address of a word-organised magnetic core store 66. Any conventional type of store other than a magnetic core type may of course be used so long as it is word-organised and fast enough in operation.

In the second mode of operation of the transfer circuit 65, a digital representation in one of the addresses of the store 66 is gated over lead 67 to the converter 60 which is then in its D/A mode. It will be appreciated that the connections between the transfer circuit 65 and the memory 66 are shown as single lines purely for clarity of the figure. When a signal appears on the lead 67 the converter 60 will, if necessary, modify the amplitude of an analogue signal supplied to the lead 68 which amplitude was set according to the last preceding digital representation on the lead 67, which would have occurred two clock pulses before.

The transfer control circuit 65 comprises any convenient arrangement of logic circuits capable of reading the contents of the addresses of the memory 66 in the same order as it caused write-in to the addresses and with a predetermined spacing between write-in and read-out. Such a spacing in said order between addresses concerned with successive writing and reading operations represents a time equal to the number of clock pulses which have occurred since the read-out address was written in. This will be an odd number if the read and write operations occur on successive clock pulses and are interleaved. So, for any particular required delay the number of addresses necessary is the largest integer not exceeding one-half of the above-mentioned number of clock pulses.

As the desired delay may not always be the same it is convenient for the memory 66 to have sufficient capacity to accommodate for the largest possible delay and for the transfer circuit 65 to be adjustable in respect of said spacing. This adjustment will normally be achieved by the settings of switches included in the circuit 65. Provision may be made for this adjustment to be automatic where the range of surface parameters contributing to the sensor signal is such that this would be advantageous.

It is necessary for the converter 60 to operate in both its modes at a rate that is sufficiently high to prevent loss of the highest frequency in the sensor output signal that is deemed significant. Accordingly, the clock source 61 should supply pulses at twice this rate and the converter 60 and transfer circuit 65 should also be switchable between their modes of operation at twice that rate. The memory 66 should have a cycle time less than the interval between the clock pulses.

With these considerations in mind, the output signal from the converter 60 on the lead 68 will be a sufficiently accurate delayed representation of the input signal on the lead 63 for combination with the output of the filter 8. Clearly there will be no undesired distortion introduced by the arrangement of FIG. 5.

We claim:

1. Apparatus for separating from a composite electric signal containing relatively higher and lower frequencies, a component consisting of the relatively higher frequencies, comprising a low-pass filter for rejecting from said composite electrical signal the relatively higher frequencies and passing, without phase distortion, only the relatively lower frequencies; delay means for delaying said composite signal, without introducing phase distortion, by an amount equal to the time delay of the low-pass filter; and signal combination means for subtracting signals at the output of the low-pass filter from synchronised signals at the output of the delay means to produce a signal comprising the component consisting of the relatively higher frequencies.

2. Apparatus according to claim 1 and further comprising a surface traversing sensor, said sensor including means for generating said composite electric signal, including a roughness component, representing the surface profile of a workpiece being traversed by said sensor, said roughness component consisting of relatively higher frequencies that are rejected by said low-pass filter.

3. Apparatus according to claim 1, wherein said delay means comprises magnetic recording and replay apparatus in which the recording and replay positions are so spaced in relation to the speed of magnetic medium to be used as to produce the desired amount of delay.

4. Apparatus according to claim 1, wherein said delay means comprises digital storage means for storing at different addresses thereof successive digital representations of the instantaneous level of said composite signal, means responsive to said composite signal for deriving said digital representations at a rate sufficient to register the highest significant frequency, means operable at said rate for directing said digital representations, in sequential order to said storage means and, after the desired delay, from the storage means, and means responsive to said digital representations from said storage means for providing analogue signal levels according to the values of said digital representations.

5. Apparatus according to claim 4 and further comprising means generating timing signals, said means for deriving and said means for providing comprising a combined analogue-to-digital and digital-to-analogue converter responsive to successive timing signals to alternate between its modes of operation, and said means for directing is included in transfer control means responsive to said timing signals to alternate between gating the latest digital representation from the converter to the next available said address and gating to the converter the contents of a said address that have been stored for a number of said timing signals equal to the desired delay.

6. Apparatus according to claim 5, wherein said means generating timing signals comprises a clock source for providing said timing signals at twice said rate, and wherein the storage means comprises a word-organised magnetic store having the word capacity of one-half the largest even number not exceeding said number of timing signals.

7. Apparatus according to claim 1, wherein there is included in the signal combination means, means for inverting signals at the output of the low-pass filter and means for adding signals from the last-mentioned means to said signals at the output of the delay means.

8. Apparatus according to claim 1, wherein there is included in the low-pass filter a transversal filter having a first frequency passband corresponding to the signals to be passed and a rejection band between that passband and any subsequent passbands, the rejection band being of sufficient width as wholly to accommodate a taper of the admittance to cut-off of a filter connected in tandem with the transversal filter.

9. Apparatus according to claim 8, wherein the transversal filter is adapted to provide an output comprising the inverse of the frequencies passed, and wherein the signal combination means comprises a summing circuit.

10. A method of separating from a composite electric signal containing relatively higher and lower frequencies, a component consisting of the relatively higher frequencies, comprising passing the composite signal through a low-pass filter effective to reject the relatively higher frequencies and to pass, without phase distortion, only the relatively lower frequencies, delaying the composite signal, without introducing phase distortion, by an amount equal to the time delay of the low-pass filter in order to bring the composite and the filtered signals into synchronism, and subtracting the filtered signal from the synchronised composite signal to produce a resulting signal which is the component consisting of the relatively higher frequencies.

References Cited

UNITED STATES PATENTS

| | | | |
|---|---|---|---|
| 3,108,230 | 10/1963 | Hurtig | 307—295X |
| 3,392,337 | 7/1968 | Neuburger | 328—140X |

STANLEY T. KRAWCZEWICZ, Primary Examiner

U.S. Cl. X.R.

324—78; 325—477; 328—138, 140